Jan. 5, 1965     J. B. BURCH ETAL     3,164,395
CARGO GATE
Filed Sept. 17, 1962     4 Sheets-Sheet 1

INVENTORS.
JAMES B. BURCH &
BY JOSEPH A. WHITE
ATTORNEYS.

INVENTORS
JAMES B. BURCH &
BY JOSEPH A. WHITE
Trask, Jenkins & Hanley
ATTORNEYS.

Jan. 5, 1965       J. B. BURCH ETAL       3,164,395
CARGO GATE
Filed Sept. 17, 1962                      4 Sheets-Sheet 4
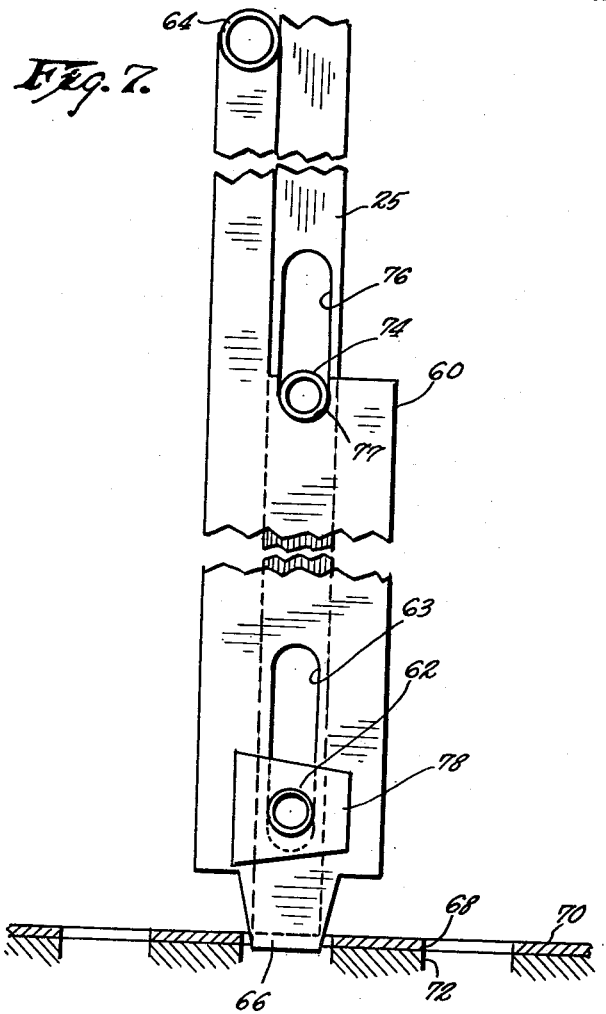
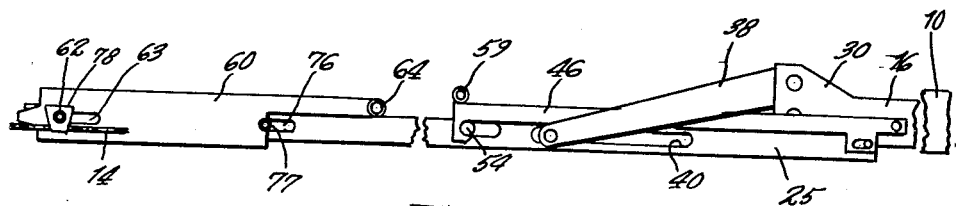
INVENTORS
JAMES B. BURCH &
BY JOSEPH A. WHITE
Trash, Jenkins & Hanley
ATTORNEYS.

United States Patent Office 3,164,395
Patented Jan. 5, 1965

3,164,395
CARGO GATE
James B. Burch, Beech Grove, and Joseph A. White, Greenwood, Ind., assignors to Hugh J. Baker & Company, Indianapolis, Ind., a corporation of Indiana
Filed Sept. 17, 1962, Ser. No. 224,015
9 Claims. (Cl. 280—179)

This invention relates to a cargo gate, and more particularly to a gate mounted in a vehicle for retaining cargo in place therein.

It is an object of our invention to provide a cargo gate for a vehicle which is movable between an operative position for holding cargo in place therein and a retracted position for permitting access to substantially the entire vehicle interior. It is a further object of our invention to provide such a cargo gate which can be quickly and easily installed in a vehicle, which can be quickly and easily moved between retracted and operative positions therein, which can be adjustably positioned along the length of said vehicle, which can be releasably locked in the desired position of adjustment, and which will prove sturdy and durable in use.

In accordance with the preferred form of our invention, a pair of parallel tracks are mounted along the opposed sides of a vehicle interior adjacent the upper ends thereof, and a pair of strips provided with pluralities of longitudinally spaced openings are mounted along the opposed edges of the vehicle floor. A pair of interconnected carriers are movably supported in the pair of tracks and support a gate swingably interconnected thereto for movement with said carriers along said tracks and movement relative to said carriers between a retracted position adjacent the plane of said tracks and a vertically disposed operative position. Conveniently, biasing means are operatively associated with said carriers and with the gate for urging said gate into its retracted position.

The gate is releasably locked in its vertically disposed operative position and in the desired position along the length of the tracks by a pair of locking means. The first such locking means comprises a pair of arms swingably connected to the carriers and gate on transverse sliding axes. Both of said arms have outwardly projecting fingers adapted to be releasably retained between longitudinally spaced abutments on the pair of tracks for retaining the upper end of the gate in its vertically disposed operative position and for retaining said gate and carriers in the desired longitudinally disposed position along the lengths of said tracks. The second such locking means comprises a second pair of arms swingably mounted on the gate adjacent its lower end and swingable about a transverse axis to dispose their lower ends in the longitudinally spaced openings formed in the pair of strips mounted on the vehicle floor for thus retaining the lower end of said gate in the desired operative position. Conveniently, means are provided on the gate for releasably locking both of said pairs of arms on the two locking means in their respective locked positions of engagement with the pair of tracks and floor mounted strips.

Other objects and features of our invention will become apparent from the more detailed description which follows and from the accompanying drawings, in which:

FIG. 1 is an enlarged fragmentary rear elevation of the cargo gate shown in FIG. 1, with portions thereof being broken away;

FIG. 4 is a vertical section taken on the line 4—4 of FIG. 2;

FIG. 7 is a fragmentary side elevation of the lower portion of the gate shown in FIG. 1; and FIG. 8 is a side elevation of our cargo gate in its retracted position, but with portions of the track being broken away.

Figure 1:
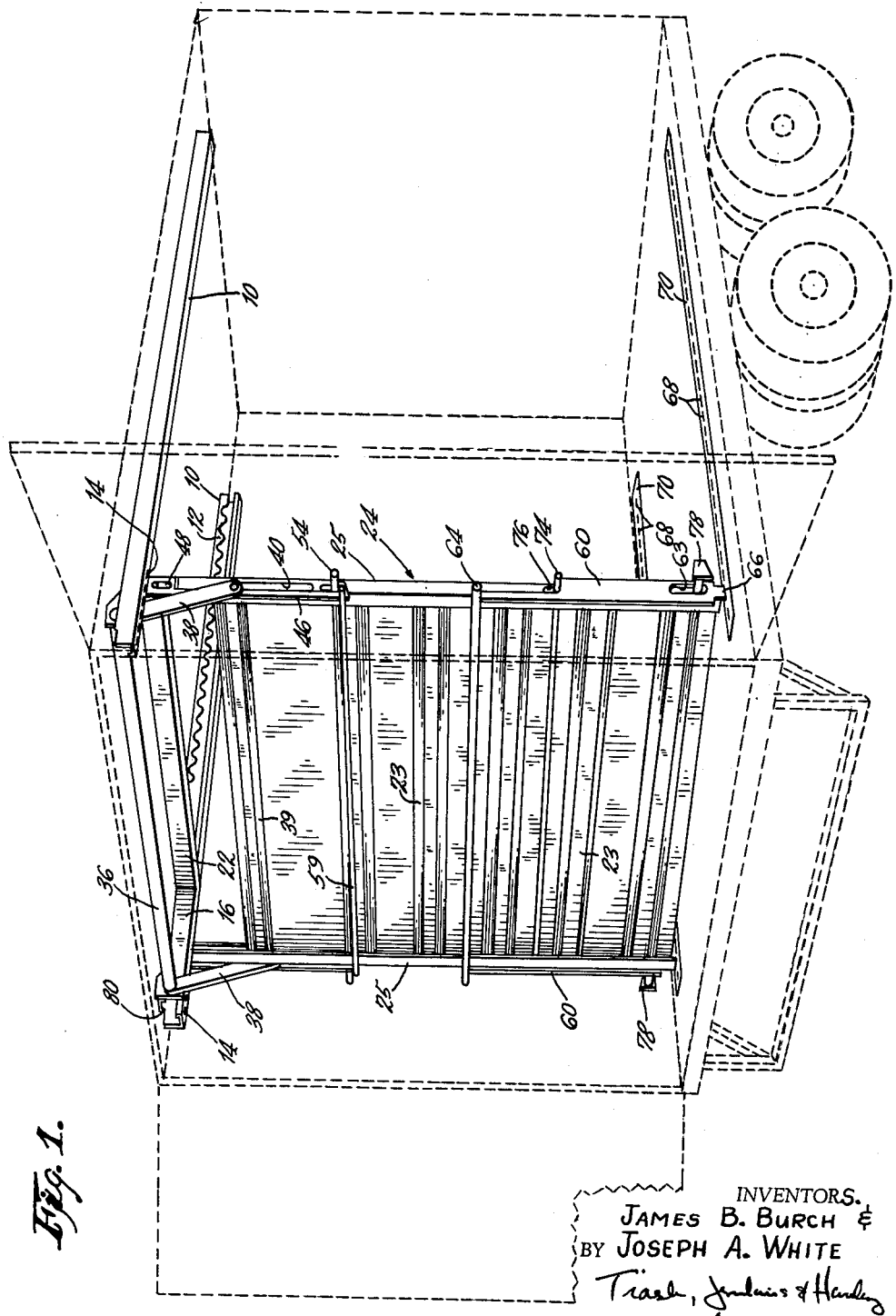
FIG. 1 is a perspective view of a cargo gate embodying our invention and showing the same mounted in a truck trailer illustrated in phantom.

Our cargo gate is illustrated in FIG. 1 as being mounted in a truck trailer to retain cargo in a fixed position therein. However, it is to be understood, of course, that our gate may be mounted in any similar type of cargo carrier wherein it is desired to keep the cargo from shifting therein.

Figure 2:
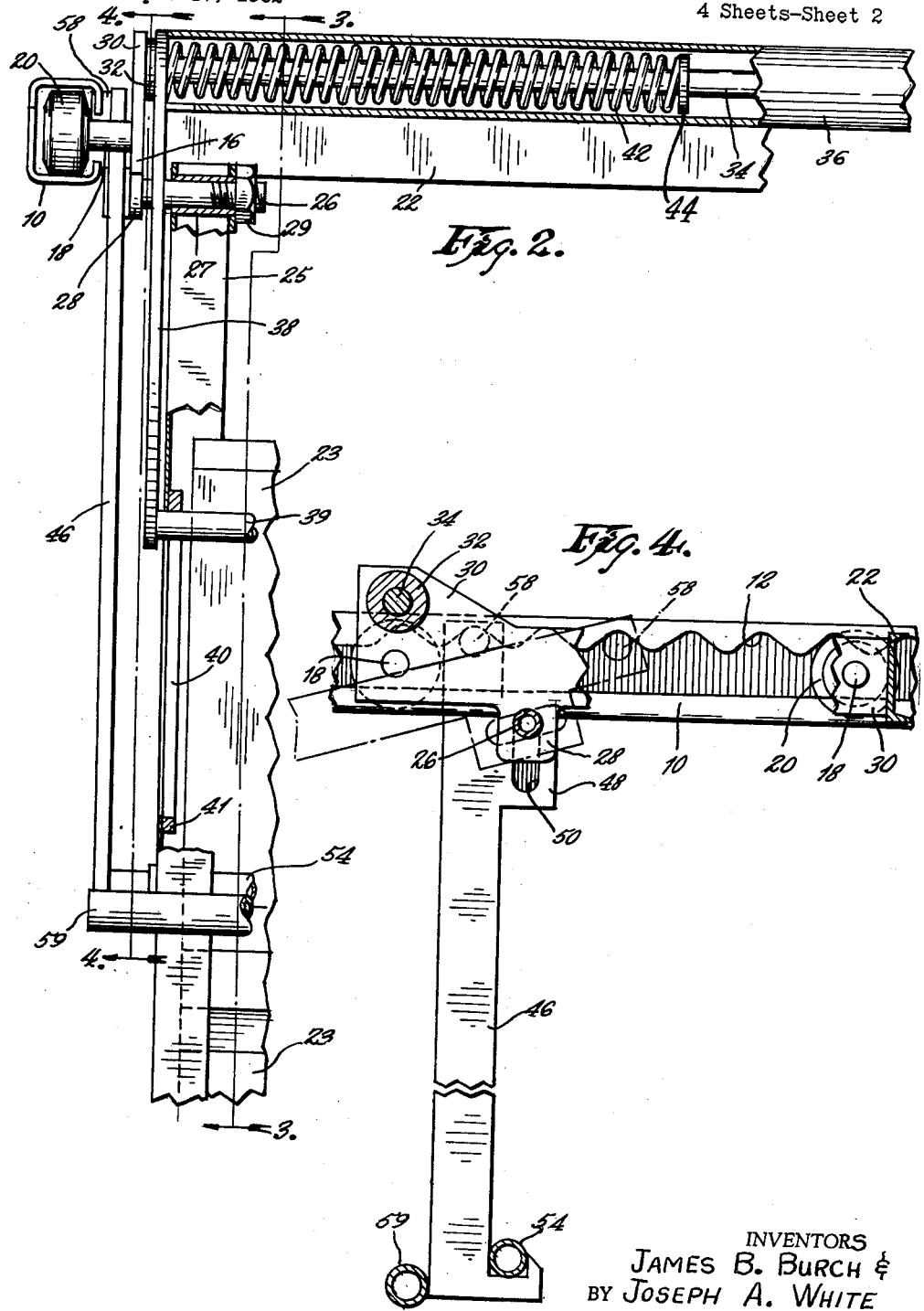

Our cargo gate is carried within a vehicle on a pair of longitudinally extending tracks 10 mounted on the opposed side walls of the vehicle adjacent the upper ends thereof. The tracks 10 are identical in construction, and as shown in FIG. 2, each of said tracks has an inwardly open generally C-shaped cross-section. For reasons that will become more apparent hereinafter, the upper inwardly presented edge of each of the tracks 10 is provided with a plurality of longitudinally spaced, downwardly projecting abutments 12, and the lower face of each of said tracks is provided with a plurality of longitudinally spaced openings 14 adjacent the rear of the vehicle.

A carrier is supported in each of the tracks 10 and comprises an elongated frame 16 having outwardly projecting axles 18 adjacent its remote ends upon which a pair of rollers 20 are mounted. The axles 18 project outwardly through the inwardly open sides of the tracks 10 to support the rollers 20 within said tracks for longitudinal movement of the carriers therealong. Conveniently, the carrier frames 16 are interconnected by a transversely extending beam 22 for effecting simultaneous movement of the carriers along their respective tracks.

A gate 24 is interposed between the pair of carriers and comprises a pair of laterally spaced, inwardly open channels 25 rigidly interconnected by a plurality of transversely extending vertically spaced cross pieces 23. Each of the channels 25 has an opening formed in its web adjacent the upper end of the gate for the reception of a stud 26 extending laterally inwardly from a downwardly projecting ear 28 on the adjacent carrier frame 16. Conveniently, a sleeved plate 27 is mounted on each channel 25 and the studs 26 are journaled therein, said studs being retained on the gate as by nuts 29 received on their tapped inner ends. The studs 26 thus define a transverse axis for swingably connecting the gate 24 to the pair of carriers and permitting said gate to be swung relative to said carriers between an operative vertical position as shown in FIG. 1 and a retracted position shown in FIG. 8 in which said gate is disposed adjacent the vehicle roof in generally coplanar relationship with the tracks 10.

As shown in FIGS. 2 and 4, adjacent their rearward ends the carriers have upwardly extending projections 30 provided with inwardly directed apertured bosses 32. A transversely extending rod 34 has its opposed ends received in said bosses and rigidly connected thereto as by welding. A sleeve 36 extends around the rod 34 and is rigidly connected at its opposed ends to a pair of downwardly projecting torque levers 38 interposed between the frame channels 25 and the carrier frames 16. Each of the levers 38 is apertured adjacent its upper end for the reception of the adjacent end of the rod 34, and each of said levers is provided adjacent its lower end with an inwardly extending rod 39 slidably received in aligned longitudinally extending slots 40 formed in the web of the adjacent frame channel 25 and a reinforcing plate 41 mounted on said channel web. A pair of coil springs 42 are received around the opposed ends of the rod 34 and have their inner ends rigidly connected to a pair of collars 44 rigidly mounted in the rod 34 inwardly from the ends thereof. The outer end of each of said springs 42 is rigidly connected to the adjacent lever 38 so that when the gate 24 is in its vertical operative position with the levers 38 extending downwardly from the sleeve 36, the springs 42 will be in torsion exerting a torque force on the levers 38 to urge them to swing upwardly and rearwardly. This biasing force on the levers 38 is transmitted to the gate 24 by the rods 39 riding in the slots 40 to thus swing the gate upwardly and rearwardly into its retracted position when it is unlocked from its operative position.

Figure 3:
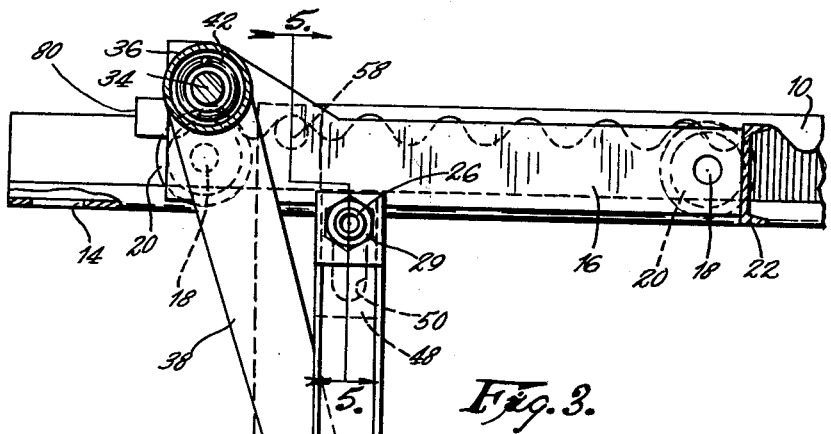
FIG. 3 is a vertical section taken on the line 3—3 of FIG. 2.
Figure 5:
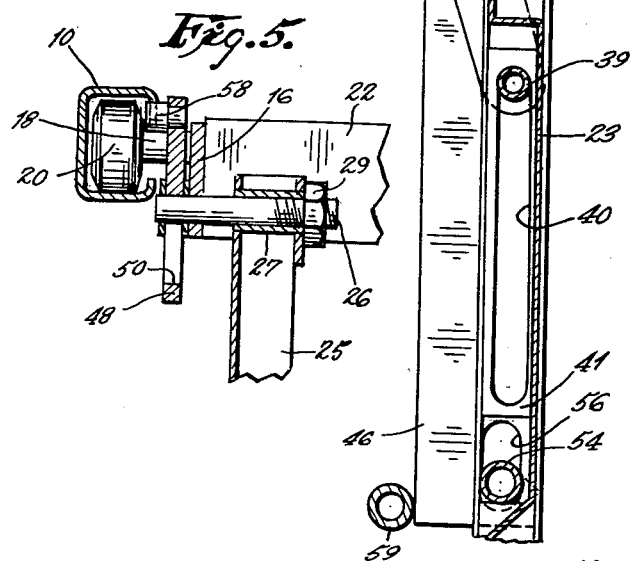
FIG. 5 is a vertical section taken on the line 5—5 of FIG. 3.
Figure 6:
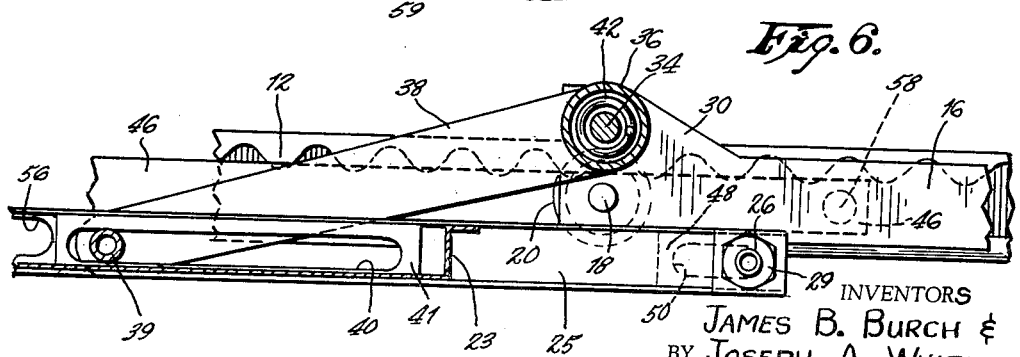
FIG. 6 is a vertical section similar to FIG. 3, but showing the upper portion of the gate in its retracted position.

In order to releasably lock the gate 24 in the desired operative position along the length of the tracks 10, an arm 46 is disposed along each side of the gate 24 between the carrier frames 16 and the tracks 10. Each of the arms 46 has a forwardly extending projection 48 adjacent its upper end in which an elongated slot 50 is formed and through which the stud 26 on the adjacent carrier extends. Each of the arms 46 extends downwardly from its projection 48 and terminates at its lower end in an upwardly projecting hook 52 in which the end of a transversely extending bar 54 is received. A shown in FIG. 3, the rod 54 is journaled in longitudinally extending slots 56 formed in the gate channels 25 so that upon raising said rod in the slots 56, the arm hooks 52 are free to swing rearwardly and upwardly relative to said gate. An outwardly projecting finger 58 is rigidly mounted on the upper end of each of the arms 46 and, when said arms are in their vertically extending locked position, the fingers 58 are received between pairs of adjacent abutments 12 on their associated tracks 10 for thus releasably locking the carriers and the gate in the desired position along the length of said track. Conversely, when the rod 54 is raised in the slots 56 to clear the hooks 52, the arms 46 may be swung upwardly and rearwardly about the axis of the studs 26 to clear the fingers 58 from the abutments 12 so that the carriers and gate may be moved along the tracks 10. Conveniently, the arms 46 are interconnected adjacent their lower ends by a transversely extending bar 59 to facilitate simultaneous rearward movement of said arms when the cross rod 54 is lifted out of engagement with the arm hooks 52.

As shown in FIGS. 1 and 7, a second pair of arms 60 are swingably mounted on the lower portion of the gate laterally outwardly from the gate frames 25. The arms 60 are swingably mounted on the gate by a transversely extending rod 62 having its ends projecting outwardly through the gate frames 25 and through longitudinally extending slots 63 formed in said arms. Conveniently, the arms 60 are interconnected at their upper ends by a transversely extending bar 64 to effect simultaneous swinging movement of said rods about the axis of the rod 62. Projections 66 extend downwardly from the arms 60 and are adapted to be received in longitudinally spaced openings 68 formed in strips 70 mounted on the vehicle floor adjacent the lateral edges thereof. Conveniently, the strips 70 may be in either the strip form as illustrated in which case recesses 72 are formed in the vehicle floor in alignment with the strip openings 68, or alternatively, the strips 70 may be in the form of inverted channels in which case there will be adequate vertical clearance between the channel webs and the floor of the vehicle and no recesses need be formed in said vehicle floor. The arms 60 are retained in their vertical locked position with their projections 66 received in the openings 68 and 72 by a transversely extending rod 74 whose ends project outwardly through elongated slots 76 formed in the webs of the frame channels 25 and are received in recesses 77 formed in the arms 60. By raising the rod 74 in the slots 76, said rod will clear the arm recesses 77 and the arms 60 are thus free to be swung about the axis of the rod 62 (counter-clockwise as viewed in FIG. 7) to clear their projections 66 from the openings 68 and 72 so that the gate is free to swing upwardly about the axis of the studs 26 into its retracted position.

As will be understood, the arms 44 and 60, respectively, releasably lock the upper and lower ends of the gate 24 in operative position. One set of such arms is sufficient to retain the gate in its operative position when the vehicle is empty or when it is carrying a relatively light cargo. However, when the cargo is heavy, it is necessary to lock both sets of the arms 46 and 60 in operative position to insure against any cargo shifting.

In order for a cargo gate to be most effective in retaining the cargo in a fixed position within a vehicle, it is necessary that the gate be in tight abutting engagement with said cargo. It is to this end, that the arms 46 are provided with the elongated slots 50 through which the studs 26 extend. The arm slots 50 thus provide a sliding and swinging interconnection between the arms and the carriers and gate so that the gate and carriers can be "inched" along the trackst 10 into tight abutting engagement with the cargo. With the arms 60 in their unlocked position and with the rod 54 disengaged from the arm hooks 52, the arms 46 may be swung upwardly and slid forwardly along the studs 26 until their fingers 58 are in engagement with the desired track abutments 12. As shown by the chain link lines in FIG. 4, the length of the slots 50 in the illustrated embodiment of our invention permits the fingers to be advanced two abutments without having to raise the gate. After the fingers 58 have been interposed between the desired abutment 12, the arms 46 are swung downwardly from the chain link line position shown in FIG. 4 and, acting through the camming action of the slots 50 and studs 26, the downward swinging movement of the arms 46 will force the carriers and thus the gate forwardly along the tracks until they are in a position to dispose the arms 46 in a vertical position in which the rod 54 may be again received in the hooks 52.

Conveniently, a pair of fingers 78 are mounted on the outer ends of the pivot rod 62. When the gate 24 is swung upwardly about the axis of the studs 26 into its retracted position, the fingers 78 are swung upwardly above the lower edge of the tracks 10, so that the gate may then be swung slightly downwardly to permit the fingers 78 to be received in the openings 14 formed in the lower faces of the tracks 10 for thus releasably locking the gate and its carriers in fixed position along the length of said tracks. Conveniently, to facilitate insertion and withdrawal of the fingers 78 in the track opening 14, the upper portion of each of tracks 10 are cut away adjacent the openings 14, as at 80.

We claim:

1. In a cargo gate for a vehicle,
   (a) a pair of parallel tracks mounted within said vehicle along the opposed upper edges thereof and provided with pluralities of longitudinally spaced abutments,
   (b) a pair of carriers each of which is carried in one of said tracks, for movement therealong,
   (c) a gate swingably interconnected to said carriers on a transverse axis for movement therewith and movement relative thereto between a retracted horizontal position adjacent the plane of said tracks and a vertical operative position,
   (d) biasing means urging said gate into retracted position,
   (e) a pair of arms swingably connected to said carriers and to the opposed sides of said gate adjacent the upper ends on a slidable transverse pivot axis and having fingers projecting outwardly therefrom,
   (f) said arms being swingable and slidable relative to said carriers and gate between an operative position in which said fingers selectively engage said abutments for advancing said carriers and gate along said tracks and for locking the carriers and gate in selected fixed position along said tracks and retracted positions in which said fingers are out of contact with said abutments, and (g) means on said gate releasably locking said arms in said operative position.

2. The invention as set forth in claim 1 with the addition that (a) a transversely extending bar is rigidly connected to said arms for effecting simultaneous swinging movement of said arms, and (b) said means comprises a transversely extending rod slidably carried in elongated slots formed in said gate and projecting outwardly from the sides of said gate for reception in hooks on said arms.

3. In a cargo gate for a vehicle, (a) a pair of parallel tracks mounted within said vehicle along the opposed upper edges thereof, (b) a pair of carriers each of which is carried in one of said tracks, for movement therealong, (c) a gate swingably interconnected to said carriers on a transverse axis for movement therewith and movement relative thereto between a retracted horizontal position adjacent the plane of said tracks and a vertical operative position, (d) spring means operatively associated with said carriers, (e) a pair of levers operatively connected to said spring means adjacent one of their ends and having rods adjacent for transmitting the biasing force of said spring means to said gate for urging said gate into retracted position, and (f) locking means operatively associated with said gate and tracks for releasably locking said gate in the desired operative position along the length of said tracks.

4. In a cargo gate for a vehicle, (a) a pair of parallel tracks mounted within said vehicle along the opposed upper edges thereof, (b) a pair of carriers each of which is carried in one of said tracks, for movement therealong, (c) a gate swingably interconnected to said carriers on a transverse axis for movement therewith and movement relative thereto between a retracted horizontal position adjacent the plane of said tracks and a vertical operative position, (d) a transversely extending member rigidly interconnected to said carriers, (e) a pair of levers swingably carried on said transverse member and slidably connected to said gate, (f) a pair of torsion springs each having one of its ends connected to said transversely extending member and its opposite end connected to one of said levers for urging said gate into retracted position, and (g) locking means operatively associated with said gate and tracks for releasably locking said gate in the desired operative position along said tracks.

5. The invention as set forth in claim 4 in which (a) said pair of leavers have inwardly projecting rods adjacent their ends remote from said transverse member slidably carried in elongated slots formed in the gate.

6. In a cargo gate for a vehicle, (a) a pair of parallel tracks mounted within said vehicle along the opposed upper edges thereof, and provided with pluralities of longitudinally spaced abutments, (b) a pair of carriers each of which is carried in one of said tracks, for movement therealong, (c) a gate swingably interconnected to said carriers on a transverse axis for movement therewith and movement relative thereto between a retracted horizontal position adjacent the plane of said tracks and a vertical operative position, (d) biasing means urging said gate into retracted position, (e) first locking means swingably connected to said carriers and gate on a slidable transverse pivot axis for movement into selective engagement with said abutments for selectively advancing the carriers and gate along said tracks and releasably locking said carriers in position along said tracks, and (f) second locking means on the lower portion of said gate engagable with said vehicle for releasably locking the lower end of said gate in operative position.

7. In a cargo gate for a vehicle, (a) a pair of parallel tracks mounted along the opposed sides of a vehicle adjacent the upper ends thereof, (b) a pair of parallel strips along the opposed edges of the floor of said vehicle having pluralities of longitudinally spaced openings formed therein, (c) a pair of carriers each of which is carried in one of said tracks, for movement therealong, (d) a gate swingably interconnected to said carriers on a transverse axis for movement therewith and movement relative thereto between a retracted horizontal position adjacent the plane of said tracks and a vertical operative position, (e) biasing means urging said gate into retracted position, (f) first locking means swingably connected to said carriers and gate and engageable with said tracks for releasably locking the upper end of said gate and said carriers against movement relative to said rails, (g) second locking means comprising a pair of arms swingably connected to said gate on a transverse axis and having projections at one of their ends extending beyond said gate upon movement of said arms into operative position for reception in said strip openings, (h) a transversely extending bar interconnecting said arms for effecting a simultaneous swinging movement thereof, and (i) means on said gate releasably engageable with with said first locking means and with locking recesses on said pair of arms for releasably retaining said first and second locking means in locking engagement with said pairs of tracks and strips.

8. In a cargo gate for a vehicle, (a) a pair of parallel tracks mounted within said vehicle along the opposed upper edges thereof, (b) each of said tracks having a generally C-shaped cross-section with its open side presented inwardly and provided with longitudinally spaced abutments therealong, (c) a pair of carriers each having a pair of longitudinally spaced rollers projecting laterally outwardly therefrom and received in one of said tracks, (d) a gate swingably interconnected to said carriers on a transverse axis for movement therewith and movement relative thereto between a retracted horizontal position adjacent the plane of said tracks and a vertical operative position, (e) biasing means urging said gate into retracted position, (f) a pair of arms swingably and slidably interconnected to said carriers and gate below the plane of said tracks, (g) said arms lying in planes intermediate said gate and carriers and having outwardly projecting fingers at their upper ends movable into engagement with said abutments upon swinging movement of said arms into an operative position for locking said carriers and gate in fixed position along the length of said tracks and movable out of engagement with said abutments upon movement of said arms into a retracted position, and (h) means on said gate releasably locking said arms in said operative position.

9. In a cargo gate for a vehicle,
   (a) a pair of parallel tracks mounted along the opposed sides of a vehicle adjacent the upper ends thereof and provided with pluralities of longitudinally spaced abutments,
   (b) a pair of parallel strips along the opposed edges of the floor of said vehicle having pluralities of longitudinally spaced openings formed therein,
   (c) a pair of carriers each of which is carried in one of said tracks, for movement therealong,
   (d) transversely extending means interconnecting said carriers and having a pair of torsion springs mounted thereon,
   (e) a pair of levers interposed between said carriers and gate and connected to said torsion springs, each of said levers having one of its ends swingably interconnected to said means and its opposite end slidably connected to said gate for urging said gate into retracted position,
   (f) a first pair of arms interposed between said carriers and tracks and swingably and slidably interconnected to said carriers and gate on a transverse axis,
   (g) means adjacent the upper ends of said first set of arms movable into engagement with said abutments upon swinging movement of said arms into an operative position for locking said carriers and gate in fixed position along the length of said tracks and movable out of engagement with said abutments upon movement of said arms into a retracted position,
   (h) a second of arms swingably connected to said gate on a transverse axis and having projections at one of their ends extending beyond said gate upon movement of said arms into operative position for reception in said strip openings, and
   (i) means on said gate engageable with said first and second pairs of arms for releasably retaining them in their locked positions.

References Cited in the file of this patent
UNITED STATES PATENTS

| | | |
|---|---|---|
| 986,810 | Dixey | Mar. 14, 1911 |
| 2,866,419 | Candlin | Dec. 30, 1958 |
| 3,017,842 | Nampa | Jan. 23, 1962 |
| 3,070,044 | Tobin | Dec. 25, 1962 |

UNITED STATES PATENT OFFICE
CERTIFICATE OF CORRECTION

Patent No. 3,164,395                      January 5, 1965

James B. Burch et al.

It is hereby certified that error appears in the above numbered patent requiring correction and that the said Letters Patent should read as corrected below.

Column 1, line 60, strike out "strips."; line 68, for "FIG. 1" read -- FIG. 2 --; column 3, line 27, for "A" read -- As --; column 4, line 22, for "trackst" read -- tracks --; column 5, line 30, after "adjacent" insert -- their opposite ends slidably received in slots in said gate remote from said transverse axis --; column 6, line 40, strike out "with"; column 8, line 8, after "second" insert -- pair --.

Signed and sealed this 22nd day of June 1965.

(SEAL)
Attest:

ERNEST W. SWIDER
Attesting Officer

EDWARD J. BRENNER
Commissioner of Patents